United States Patent [19]

Singer et al.

[11] Patent Number: 5,599,874
[45] Date of Patent: Feb. 4, 1997

[54] THERMOPLASTIC POLYURETHANE ELASTOMER BASED ON A HYDROXYL TERMINATED POLYOL, AN AROMATIC CHAIN EXTENDER AND 1,5 NAPHTHALENE DIISOCYANATE

[75] Inventors: Stephen M. Singer, Peoria; Mark T. Allott, Chillicothe, both of Ill.

[73] Assignee: Caterpillar Inc., Peoria, Ill.

[21] Appl. No.: 502,017

[22] Filed: Jul. 13, 1995

Related U.S. Application Data

[63] Continuation of Ser. No. 111,683, Aug. 25, 1993, abandoned.

[51] Int. Cl.$^6$ .............................. C08J 3/00; C08K 3/20; C08L 75/00
[52] U.S. Cl. .................. 524/590; 523/217; 523/220; 524/430; 524/442; 524/493; 524/494; 524/444; 524/847; 528/65; 528/66; 528/59; 528/74; 428/297.4
[58] Field of Search ................... 524/442, 493, 524/494, 590, 847, 444, 430; 528/65, 59, 66, 74; 523/217, 220; 428/241, 228, 268, 303

[56] References Cited

U.S. PATENT DOCUMENTS

| H812 | 8/1990 | George | 524/444 |
|---|---|---|---|
| 4,254,010 | 3/1981 | Minzuno et al. | 260/40 TN |
| 4,738,622 | 4/1988 | Kawahara et al. | 433/169 |
| 4,822,827 | 4/1989 | Bonk et al. | 521/170 |

OTHER PUBLICATIONS

"Preparation And Properties Of High Performance, Liquid Cast Urethane Elastomers Extended With Hydroquinon Di(B–Hydroxyethyl) Ether)", M. Palmer et al. (Presented at a Meeting of The Polyurethane Manufacturers Assoc., Chicago, IL, Apr. 17–20, 1977.

*Primary Examiner*—Paul R. Michl
*Assistant Examiner*—Patrick Niland
*Attorney, Agent, or Firm*—Pankaj M. Khosla

[57] ABSTRACT

A thermoplastic polyurethane elastomeric seal composition comprising, by weight, about 90% to 99% thermoplastic polyurethane elastomer and about 1% to 10% fibers. Also, the thermoplastic polyurethane elastomer is derived from the reactants comprising: (i) a mixture of polyol and an aromatic chain extender in a molar ratio in the range of from about 40:60 to about 60:40 of butanediol glycol adipate to hydroquinone bis 2-hydroxyethyl ether, and (ii) 1,5 naphthalene diisocyanate present in a molar ratio in the range of about 50:50 to about 54.5:45.5 of 1,5 naphthalene diisocyanate to the said first mixture of polyol and an aromatic chain extender. After curing, the thermoplastic polyurethane elastomeric seal compound has outstanding wear resistance and low compression set.

This thermoplastic polyurethane elastomeric seal compound is particularly useful in making shaft seals subject to high wear and high pressure, for use in hydraulic rams in earthmoving equipment.

20 Claims, No Drawings

THERMOPLASTIC POLYURETHANE ELASTOMER BASED ON A HYDROXYL TERMINATED POLYOL, AN AROMATIC CHAIN EXTENDER AND 1,5 NAPHTHALENE DIISOCYANATE

DESCRIPTION

This is a file wrapper continuation of application Ser. No. 08/111,683, filed Aug. 25, 1993, now abandoned.

TECHNICAL FIELD

This invention relates generally to a thermoplastic polyurethane elastomer. More particularly, this invention relates to a thermoplastic polyurethane elastomeric composition for forming injection moldable articles which have outstanding wear resistance and low compression set.

BACKGROUND ART

There has been a need for a tough but flexible polyurethane elastomeric composite material that can be used to make articles such as hydraulic cylinder seals that have excellent abrasion resistance, low compression set, and good thermal stability, oil resistance and tensile properties. It has been desired that such a material be injection moldable to be able to form articles having intricate shapes and stringent dimensional tolerances. It is further desired that this material be thermoplastic in nature to facilitate ease and economy in processing and minimization of scrap waste.

Polyurethane is formed by reacting a polyol with an isocyanate in the following manner:

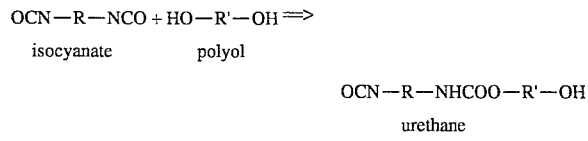

The overall properties of the polyurethane will depend upon the type of polyol and isocyanate, the degree of crosslinking and crystallinity in the polyurethane, the molecular weight of the polyurethane and chemical structure of the polyurethane backbone.

Polyurethanes may be either thermoplastic or thermoset, depending on the degree of crosslinking present. Thermoplastic urethanes do not have primary crosslinking while thermoset polyurethanes have a varying degree of crosslinking, depending on the functionality of the reactants.

Thermoplastic polyurethanes are commonly based on either methylene diisocyanate (MDI) or toluene diisocyanate (TDI) and include both polyester and polyether grades of polyols. Further, both thermoset and thermoplastic polyurethanes can be formed by a "one-shot" reaction between isocyanate and polyol or by a "pre-polymer" system, wherein a curative is added to the partially reacted polyolisocyanate complex to complete the polyurethane reaction. Examples of some common thermoplastic polyurethane elastomers based on a "pre-polymers" are "Texin", a tradename of Miles, Inc., "Estane", tradename of BFGoodrich Co., "Pelletbane", a tradename of Dow Chemical Co., and "Elastollan", a tradename of BASF, Inc.

Several 1,5 naphthalene diisocyanate (NDI) based thermoset polyurethanes are commercially produced. One example of such a thermoset polyurethane is "Vulkallon", a tradename of Miles, Inc. However, thermoset polyurethanes cannot be used to injection mold intricate articles with tight dimensional tolerances. Further, any scrap generated during the molding of a thermoset polyurethane cannot be reused whereas the scrap from molding a thermoplastic polyurethane can be ground, dried and reused.

U.S. Pat. No. 4,254,010 issued to S. Mizuno et al. on Mar. 3, 1981, proposes the use of NDI as one of several isocyanates that may be alternatively used to form a rigid (non-elastomeric) thermoplastic polyurethane plastic material. Heretofore, there has been no known thermoplastic polyurethane elastomer that is based on NDI.

Hydroquinone bis 2-hydroxyethyl ether (HQEE) has been used as a chain extender in pre-polymer type MDI and TDI (non-NDI) based polyurethanes. Heretofore, there has been no known thermoplastic polyurethane elastomer that is based on HQEE and NDI.

The use of glass fibers in polyurethane compositions is described in U.S. Pat. No. 4,254,010, issued to S. Mizuno et al. on Mar. 3, 1981. That patent discloses the dispersal of aminosilane or epoxysilane coated glass fibers in a thermoplastic polyurethane to make a resin composition suitable for forming rigid (plastic) articles that resist warpage during molding. Heretofore, there has been no known thermoplastic polyurethane elastomeric composition containing fibers that has superior wear and compression set characteristics but still remains elastic enough to be used as a seal compound.

The present invention is directed to overcoming one or more of the problems as set forth above.

DISCLOSURE OF THE INVENTION

In one aspect of the present invention, a thermoplastic polyurethane elastomer is derived from a reaction between a saturated hydroxyl terminated difunctional polyol, an aromatic difunctional chain extender, and 1,5 naphthalene diisocyanate (NDI).

In another aspect of this invention, a plurality of fibers are dispersed in the thermoplastic polyurethane elastomer.

Another aspect of this invention includes a thermoplastic polyurethane elastomer wherein the aromatic difunctional chain extender is hydroquinone bis 2-hydroxyethyl ether (HQEE).

Yet another aspect of this invention includes a thermoplastic polyurethane elastomeric seal composition comprising a thermoplastic polyurethane elastomer derived from a saturated hydroxyl terminated polyfunctional polyol, hydroquinone bis 2-hydroxyethyl ether (HQEE), and 1,5 naphthalene diisocyanate (NDI), and a plurality of fibers dispersed in the thermoplastic polyurethane elastomer, wherein the seal composition has a compression set no greater than 30% after heating for a period of about 16 hours at a temperature of about 110° C.

Still another aspect of this invention includes a process for forming a thermoplastic polyurethane seal material.

BEST MODE FOR CARRYING OUT THE INVENTION

In the preferred embodiment of the present invention, the saturated hydroxyl terminated polyfunctional polyglycol used is butanediol polyglycol adipate (BPA). The specific BPA used is a high-molecular-weight butanediol polyglycol adipate having an active hydroxyl group (OH group) at both of its ends. The molecular weight of BPA is desirably in the range of 500 to 3000 gms/mole, and preferably in the range of 750 to 2000 gms/mole. The hydroxyl value, defined as the number of milligrams of potassium hydroxide equivalent to the hydroxyl content of 1 gm of the polyol, is desirably in the range of 50 to 150, and preferably in the range of 90 to 130. As the molecular weight of the BPA increases, the resulting polyurethane backbone has fewer urethane linkages and is more flexible. The difunctional nature of the BPA gives the resultant polyurethane its thermoplastic character. Other examples of saturated hydroxyl terminated polyfunctional polyglycols that may alternatively be used are ethylene glycol adipate, ethylene-propylene glycol adipate and butylene-ethylene glycol adipate. The BPA used in carrying out the preferred embodiment of making a thermoplastic polyurethane elastomer has a tradename "Rucoflex Saturated Polyester Diol S-102-110", is manufactured by Ruco Polymer Corporation, and has a molecular weight of 980 gms/mole and a hydroxyl value of 110.

In the preferred embodiment of the present invention, the aromatic difunctional chain extender used is hydroquinone bis 2-hydroxyethyl ether (HQEE). HQEE is a linear, symmetrical polyether diol incorporating an aromatic ring which contributes to the stiffness of the polyurethane elastomer, enhancing its physical properties. The hydroxyl value of HQEE is desirably in the range of 545 to 575 and the molecular weight of HQEE is desirably in the range of 190 to 210 gms/mole. Other examples of aromatic difunctional chain extenders that may be used are aromatic difunctional polyethers diols or diamines such as 4,4'-diamino diphenyl sulfone, m-phenylene diamine and 4,4'-methylene dianiline. However, it has been found that only HQEE produces the most desirable properties. The HQEE used in carrying out the preferred embodiment of making the thermoplastic polyurethane elastomer has a tradename "RC Crosslinker 30/10 tt", is manufactured by Rhein Chemie Corporation and has a hydroxyl value of about 566 and a molecular weight of about 198 gms/mole.

In the preferred embodiment of the present invention, the NDI used is a difunctional isocyanate with a rigid aromatic ring structure that imparts physical strength to the polyurethane elastomer. The molecular weight of NDI is preferably about 210 gms/mole. The NDI used in carrying out the preferred embodiment of making the thermoplastic polyurethane elastomer has a tradename "Desmodur 15", is manufactured by Miles, Inc and has a molecular weight of 210 gms/mole.

In the preferred embodiment of the present invention, the plurality of fibers dispersed in the thermoplastic polyurethane elastomer composition are a mixture of glass fibers and ceramic fibers. It has been discovered that these fibers advantageously impart excellent wear resistance to the polyurethane and yet maintain its suitability for being injection moldable, only when they are added in no more than 10% by weight of the elastomer composition. Higher amounts of fibers actually make the polyurethane too hard and tough to process. Furthermore, at about 4% by weight, these fibers do not disadvantageously decrease the elasticity or resilience of the polyurethane, maintaining its suitability for use as a seal material. The glass fibers desirably have a length from about 0.5 mm to about 3 mm, a diameter from about 0.01 mm to about 0.3 mm, and a length to diameter ratio (L/D ratio for short) from about 10 to about 20. The glass fibers preferably have a length of from about 1 mm to about 2 mm, a diameter of from about 0.1 mm to about 0.2 mm, and a L/D ratio of about 15. The ceramic fibers desirably have a length of from about 0.05 mm to about 0.5 mm, a diameter of from about 0.01 mm to about 0.05 mm, and a L/D ratio of from about 2 to about 15. The ceramic fibers preferably have a length of from about 0.05 mm to about 0.3 mm, a diameter of from about 0.015 mm to about 0.03 mm, and a L/D ratio of about 6. Other examples of fibers that can be used by themselves or in combination with glass and ceramic fibers are carbon fibers, aramid fibers and ultra-high molecular weight polyethylene (UHMWPE). However, it has been discovered that only the combination of glass and ceramic fibers produces the most desirable features such as wear and compression set resistance. The glass fibers used in carrying out the preferred embodiment of making the thermoplastic polyurethane elastomer composition have a tradename "Fiberglas 737 BD", are manufactured by Owens Corning Fiber Glass Corp., and have an average fiber length of 1.5 mm, a mean diameter of 0.1 mm, and a mean L/D ratio of about 15. The ceramic fibers used in carrying out the preferred embodiment of making the thermoplastic polyurethane elastomer composition have a tradename "Fiberfrax EF 119", are manufactured by Carborundum Co., and have an average fiber length of 0.14 mm, a mean diameter of 0.025 mm, and a mean L/D ratio of about 6.

The term "mixing", as used herein means combining component A with component B, or vice versa, with simultaneous agitation, to form a homogeneous mixture of A and B.

The term "reacting", as used herein means combining component A with component B, or vice versa, with simultaneous agitation, thereby forming a new component C.

For the thermoplastic polyurethane elastomer compound described in the illustrative examples A, B, C and D, the process of forming the polyurethane specifically includes the following steps:

1. BPA is heated to a temperature desirably in the range of about 65° C. to 75° C. and preferably 70° C.
2. HQEE is heated to a temperature desirably in the range of about 100° C. to 110° C. and preferably 105° C. or until melted. BPA is heated to lower its viscosity and HQEE is heated so as to melt it and enable it to be mixed with BPA.
3. BPA and HQEE are mixed in a molar ratio desirably in the range of from about 60:40 to about 40:60 and preferably of about 55:45 said BPA to said HQEE, resulting in a substantially equimolar first resultant mixture. It has been found that this mixture of BPA and HQEE yields the most desirable properties in a polyester polyol-aromatic polyether diol blend which when reacted with NDI, results in a tough, temperature and oil resistant polyurethane suitable for forming hydraulic cylinder seals.
4. This first resultant mixture is then heated to a temperature desirably in the range of about 100° C. to 100° C. and preferably 105° C.
5. The mixture of glass and ceramic fibers are added in the first resultant mixture, desirably in a range of about 1 to 10% by weight and preferably in the range of about 3 to 7% by weight of total elastomer composition, resulting in a second resultant mixture.
6. The second resultant mixture is then heated to a temperature desirably in the range of about 130° C. to 140° C. and preferably about 135° C. The mixture of glass fibers to ceramic fibers is present in a weight ratio desirably in the range of about 25:75 to about 75:25 and preferably about 50:50. It has been found that fibers present in such a weight ratio, advantageously increase the wear resistance of the resultant polyurethane.
7. NDI is heated to a temperature desirably in the range of about 130° C. to 135° C.
8. NDI is reacted with the second resultant mixture in a molar ratio preferably of about 53 moles of NDI to 47 moles of the mixture of BPA and HQEE to form a resultant compound. Alternatively, NDI is reacted with the second resultant mixture in a weight ratio such that the number of isocyanate groups (NCO groups) of NDI per total active hydroxyl groups (OH groups) of the mixture of BPA and HQEE) is desirably in the range of 1 to 1.2 and preferably, about 1.12.
9. The resultant compound is heated up to a temperature desirably in the range of 135° C. to 145° C.
10. The resultant compound is then cured at a temperature of about 121° C. for a period of about 10 minutes and post-cured for a period of 16 hours at 110° C., thereby forming a resultant thermoplastic polyurethane elastomeric seal material.

In the preferred embodiment of the present invention, the thermoplastic polyurethane elastomeric seal material is derived from the reactants having the following composition comprising, by weight percent:

| | |
|---|---|
| BPA | 60.0 |
| HQEE | 10.0 |
| NDI | 26.2 |
| Glass fibers | 1.9 |
| Ceramic fibers | 1.9 |

Further, as shown by the following Examples, the thermoplastic polyurethane elastomeric seal embodying the present invention has improved compression set, improved wear resistance and substantially the same, or better, properties in tension such as ultimate tensile strength and elongation, and surface hardness as well as specific gravity.

The compression set of all the Examples described below was measured according to ASTM Test Method D 395 (Test Method B), Standard Test Methods for Rubber Property-Compression Set. The specimens for the compression set test were prepared by molding cylindrical disks of specified dimension and curing in an oven for 10 minutes at 121° C., followed by a post cure for 16 hours at 110° C. The compression set was measured after heat ageing the buttons in an oven for 22 hours at 70° C.

The surface hardness of all the Examples described below was measured according to ASTM Test Method D 2240 (Shore D), Standard Test Method for Rubber Property, Durometer Hardness.

The specific gravity of all the Examples described below was measured according to ASTM Test Method D 792 (Test Method A), Standard Test Methods for Specific Gravity (Relative Density) and Density of Plastics by Displacement.

The tensile properties of all the Examples described below were measured according to ASTM Test Method D 412 (Test Method A), Standard Test Methods for Rubber Properties in Tension, at a strain rate of 20 inches per minute.

The wear characteristics of all the Examples described below were determined according to a seal wear test procedure developed by Caterpillar Inc., which includes the following steps:
1. A plaque, having a selected composition and a thickness of 3 mm, is injection molded.
2. Out of this plaque, test samples are die cut, each test sample shaped like a flat annular disk having an inside diameter of 42 mm, an outside diameter of 60 mm and a thickness of 3 mm.
3. The test sample is rigidly attached to a circular steel backing plate and mounted on a spindle capable of rotation at varying speeds.
4. A layer of SAE grade 80W90 oil is applied to the test sample surface.
5. The test sample is brought into contact concentrically with an annular wear plate having an inside diameter of 52.7 mm, an outside diameter of 76.2 mm and a surface roughness of 1.15 microns such that the resultant contact area between the test sample and the wear plate is 1 in$^2$.
6. The annular wear plate is mounted in a non-rotating fixture which is capable of movement in a direction towards the test sample.
7. A 200 lb. load is applied to the fixture, thereby compressing the test sample to the wear plate.
8. The spindle is then rotated at 200 rpm while maintaining the 200 lb. load on the test sample.
9. The interface temperature is measured at four locations spaced 90 degrees apart every 50 seconds.
10. After 1000 minutes, the spindle is stopped, the test sample removed from the steel backing plate, and its final thickness is measured and recorded. The % wear loss is calculated as follows;

$$\% \text{ wear loss} = \frac{t_i - t_f}{t_i} \times 100$$

where $t_i$ is the initial thickness and $t_f$ is the final thickness of the test sample.

In the following Examples, test samples 1, 2, 3, and 4 are commercially available MDI-based thermoplastic polyurethanes and test sample 5 is a commercially available NDI-based thermoset polyurethane. Specifically, sample 1 is "Texin 345 D", sample 2 is "Estane 58130", sample 3 is "Pellethane 2102-90AR", sample 4 is "Elastollan C95A", and sample 5 is "Vulkallon 30". These 5 polyurethanes are compared below with test samples embodying the present invention.

EXAMPLE A

In accordance with the present invention, BPA and HQEE are mixed in a molar ratio of 55:45::BPA:HQEE, and reacted with NDI in a molar ratio of 53:47::NDI:(BPA+HQEE), or alternatively reacted with NDI such that the isocyanate index, defined as the ratio of NCO groups to the OH groups, is 1.12. Test sample 6, representative of the preferred embodiment of the present invention, was formed by adding glass and ceramic fibers to the above mixture. Thus, test sample 6 is derived from reactants having the following composition:

| TEST SAMPLE 6 | | | | | |
|---|---|---|---|---|---|
| | MOLES | MOLE % | MW gm/mol | WEIGHT gms | WEIGHT % |
| BPA | 0.55 | 25.9 | 980 | 539.0 | 60.0 |
| HQEE | 0.45 | 21.3 | 198 | 89.1 | 10.0 |
| NDI | 1.12 | 52.8 | 210 | 235.2 | 26.2 |
| Glass | — | — | — | 17.4 | 1.9 |
| Ceramic | — | — | — | 17.4 | 1.9 |

Test sample 7 is the same as sample 6 but without any fibers. After forming each of the above described materials, the physical properties of samples 1–6 were tested in accordance with the previously identified standardized test procedures. The results of those tests are shown in Table I.

TABLE I

| | TEST SAMPLES | | | | | |
|---|---|---|---|---|---|---|
| PROPERTY | 1 | 2 | 3 | 4 | 5 | 6 |
| % Comp. Set | 31.5 | 41.5 | 40.8 | 40.9 | 31.0 | 27.5 |
| Sp. Gravity | 1.22 | 1.20 | 1.20 | 1.22 | 1.25 | 1.22 |
| Hardness, Sh D | 40 | 50 | 48 | 50 | 43 | 52 |

TABLE I-continued

| | TEST SAMPLES | | | | | |
|---|---|---|---|---|---|---|
| PROPERTY | 1 | 2 | 3 | 4 | 5 | 6 |
| Tensile, psi | 4000 | 6000 | 5900 | 4700 | 2779 | 6500 |
| % Elongation | 560 | 550 | 525 | 550 | — | 500 |

It can be seen that sample 6 has significantly lower compression set and higher tensile strength than any of the other samples. Samples 1 and 5 are the closest to sample 6 in compression set value, but have substantially lower tensile strength and hardness.

Each of the seven sample materials were further tested for wear loss as described above. Table II shows the wear loss of the commercially available polyurethanes (samples 1–5) and test samples 6 and 7.

TABLE II

| | TEST SAMPLES | | | | | | |
|---|---|---|---|---|---|---|---|
| PROPERTY | 1 | 2 | 3 | 4 | 5 | 6 | 7 |
| % wear loss | 81.6 | 69.3 | 37.6 | 37.7 | 2.2 | 1.7 | 2.5 |

As shown in the above table, sample 6 has lowest wear loss. Sample 7 which does not have the glass or ceramic fibers, has somewhat higher wear loss but still significantly less than the other commercial thermoplastic polyurethane materials (samples 1–4). Sample 5 is the only sample with wear loss somewhat comparable to sample 7. However, it is a thermoset material and sample 5 does not have the advantage provided by thermoplastic samples 6 and 7. However, sample 5 does not have as low a wear loss as sample 6.

EXAMPLE B

Test samples 8–12 were derived from reactants having the following composition:

TABLE III

| | TEST SAMPLES | | | | |
|---|---|---|---|---|---|
| PROPERTY | 8 | 9 | 10 | 11 | 12 |
| % Compression Set | — | 41.5 | — | 35.0 | 37.0 |
| Tensile Strength, psi | 5612 | 7643 | 8276 | 8549 | 8323 |
| % Elongation | 732 | 853 | 748 | 724 | 626 |

As shown in the above table, as the isocyanate index approaches 1.0, the tensile strength tends to decrease and the compression set increases. At isocyanate indices ranging from 1.0 to about 1.12, the tensile strength increases and the compression set decreases. However, as the index is increased to 1.16, it is observed that the tensile strength begins to drop and the compression set tends to rise again. It has been observed that at an index higher than 1.16, the thermal stability of the polyurethane decreases due to the formation of urea linkages promoted by the excess isocyanate. Thus, it is expected that for isocyanate indices above 1.16, the polyurethane will become too hard and its compression set will be too high. Thus, at an isocyanate index within the range of from about 1.04 and to about 1.16, polyurethane seal material can be used to make seals that exhibit good elasticity, tensile strength and low compression set.

It has been observed that the key physical properties of polyurethane such as tensile strength, well the polyurethane material will perform from a wear resistance standpoint, once it is incorporated with glass and ceramic fibers. Referring back to Table I and II, it is seen that sample 6, which has the least amount of wear loss, also has a combination of the highest tensile strength, high elongation and low compression set. It has been observed that in order to maintain a good combination of the above properties, the limits of the molar ratio of BPA:HQEE are 40:60 and 60:40.

In summary, the above Examples demonstrate that the most advantageously desirable properties like low compres-

| | TEST SAMPLES 8–12 | | | | | |
|---|---|---|---|---|---|---|
| | REACTANT | MOLES | MOLE % | MW | WEIGHT gm/mol | WEIGHT % gms |
| Sample 8 | BPA | 0.55 | 27.5 | 980 | 539.0 | 64.3 |
| | HQEE | 0.45 | 22.5 | 198 | 89.1 | 10.6 |
| | NDI | 1.00 | 50.0 | 210 | 210.0 | 25.1 |
| Sample 9 | BPA | 0.55 | 27.0 | 980 | 539.0 | 63.7 |
| | HQEE | 0.45 | 22.0 | 198 | 89.1 | 10.5 |
| | NDI | 1.04 | 51.0 | 210 | 218.4 | 25.8 |
| Sample 10 | BPA | 0.55 | 26.4 | 980 | 539.0 | 63.0 |
| | HQEE | 0.45 | 21.6 | 198 | 89.1 | 10.4 |
| | NDI | 1.08 | 52.0 | 210 | 226.8 | 26.6 |
| Sample 11 | BPA | 0.55 | 25.9 | 980 | 539.0 | 62.4 |
| | HQEE | 0.45 | 21.2 | 198 | 89.1 | 10.3 |
| | NDI | 1.12 | 52.9 | 210 | 235.2 | 27.3 |
| Sample 12 | BPA | 0.55 | 25.5 | 980 | 539.0 | 61.8 |
| | HQEE | 0.45 | 20.8 | 198 | 89.1 | 10.2 |
| | NDI | 1.16 | 53.7 | 210 | 243.6 | 28.0 |

After forming each of the above described materials (samples 8–12), they were tested in accordance with the previously identified standardized test procedures. The results of those tests are shown in Table III.

sion set, high wear resistance and good tensile strength are attained with the composition set forth in sample 6 as described in Example A and within the ranges defined by samples 8–12 as described in Example B.

Industrial Applicability

The thermoplastic polyurethane elastomeric seal compound of the present invention is particularly useful in making injection molded seals that have intricate geometrical shapes and require tight dimensional tolerances.

One example of a successful use of this seal compound is for making hydraulic cylinder shaft seals in applications where the high pressure capacity, low compression set and low wear rate of this polyurethane can be exploited to achieve improved seal life. Such applications include sealing rings for hydraulic rams on earth-moving equipment, seals for all types of high pressure greasing equipment, and most high pressure static or reciprocating seals for pneumatic or hydraulic use.

Another example of a successful use of this polyurethane seal compound is for making seals for control valves used in the mining industry. The seals in these type of valves also serve to seal off high pressure bleed valves. As there is a high velocity flow of hydraulic fluid across the sealing surface, these seals can be easily scoured or abraded. The present invention can overcome that problem.

This invention can be useful for making seals where the sealing area is small and the seal operates high and low pressures. Here, a seal material which has low compression set is required to prevent leakages at low pressures. The present invention is particularly useful in such applications.

Other aspects, features and advantages of the present invention can be attained from a study of this disclosure together with the appended claims.

We claim:

1. A thermoplastic polyurethane elastomeric composition, comprising:
   a thermoplastic polyurethane elastomer derived from the reactants comprising;
   a saturated hydroxyl terminated polyester diol, wherein said polyester diol is formed by polymerizing 1,4 butanediol with adipic acid, and wherein said polyester diol has a number average molecular weight in the range of 500 gms/mole to 3000 gms/mole;
   a difunctional aromatic chain extender, and
   1,5 naphthalene diisocyanate;
   wherein said saturated hydroxyl terminated polyester diol and said difunctional aromatic chain extender are present in a molar ratio in the range of from about 40:60 to about 60:40 of said saturated hydroxyl terminated polyester diol to said difunctional aromatic chain extender and defining a polyester diol and chain extender mixture, and said 1,5 naphthalene diisocyanate and said polyester diol and chain extender mixture are present in a molar ratio in the range of from about 50:50 to about 54.5:45.5 of said 1,5 naphthalene diisocyanate to said polyester diol and chain extender mixture, and
   wherein said thermoplastic polyurethane elastomer has an elongation in the range of about 500% to 853%.

2. The composition, as set forth in claim 1, wherein dispersed in the said thermoplastic polyurethane elastomer, are a plurality of fibers, said fibers being present from about 1% to no more than 10% by weight of said composition.

3. The composition, as set forth in claim 2, wherein said fibers include a combination of glass fibers and ceramic fibers.

4. The composition, as set forth in claim 3, wherein said glass fibers and ceramic fibers in said combination are present in a weight ratio in the range of about 1:3 to about 3:1 glass fibers to ceramic fibers.

5. The composition, as set forth in claim 4, wherein said glass fibers and ceramic fibers are present in a weight ratio of about 1:1.

6. The composition, as set forth in claim 3, wherein said glass fibers have a length of from about 0.5 mm to about 3 mm; a diameter of from about 0.01 mm to about 0.3 mm; and a length to diameter ratio of from about 10 to about 20.

7. The composition, as set forth in claim 6, wherein the length of said glass fibers is about 1.5 mm and the diameter of said glass fibers is about 0.1 mm.

8. The composition, as set forth in claim 3, wherein said ceramic fibers have a length of from about 0.05 mm to about 0.5 mm; a diameter of from about 0.01 mm to about 0.05 mm; and a length to diameter ratio of from about 2 to about 15.

9. A composition, as set forth in claim 8, wherein the length of said ceramic fibers is about 0.14 mm and the diameter of said ceramic fibers is about 0.025 mm.

10. The composition, as set forth in claim 1, wherein said difunctional aromatic chain extender is hydroquinone bis 2-hydroxyethyl ether.

11. The composition, as set forth in claim 1, wherein said saturated hydroxyl terminated polyester diol and difunctional aromatic chain extender are present in a molar ratio of about 55:45.

12. The composition, as set forth in claim 1, wherein said 1,5 naphthalene diisocyanate and said polyester diol and chain extender mixture are present in a molar ratio of about 53:47.

13. The composition, as set forth in claim 1, wherein said saturated hydroxyl terminated polyester diol has a hydroxyl value in the range of about 50 to about 150 and a number average molecular weight in the range of 750 gms/mole to 2500 gms/mole and said difunctional aromatic chain extender has a hydroxyl value in the range of about 545 to about 575 and a molecular weight in the range of about 190 to about 210 gms/mole.

14. The composition, as set forth in claim 13, wherein said polyester diol has a hydroxyl value of about 110 and a number average molecular weight of 1000 gms/mole and said aromatic chain extender has a hydroxyl value of about 566 and a molecular weight of about 198 gms/mole.

15. The composition, as set forth in claim 1, wherein the thermoplastic polyurethane elastomer is derived from reacting said polyester diol and chain extender mixture with said 1,5 naphthalene diisocyanate in a weight ratio such that the number of isocyanate groups of said 1,5 naphthalene diisocyanate per active hydroxyl group of said polyester diol and chain extender mixture is in the range of about 1.0 to about 1.2.

16. The composition, as set forth in claim 15, wherein the thermoplastic polyurethane elastomer is derived from reacting said polyester diol and chain extender mixture with said 1,5 naphthalene diisocyanate in a weight ratio such that the number of isocyanate groups of said 1,5 naphthalene diisocyanate per active hydroxyl group of said polyester diol and chain extender mixture is about 1.12.

17. A thermoplastic polyurethane elastomeric seal composition, comprising:
   a thermoplastic polyurethane elastomer derived from the reactants comprising;
   a saturated hydroxyl terminated polyester diol, wherein said polyester diol is formed by polymerizing 1,4 butanediol with adipic acid, and wherein said polyester diol has a number average molecular weight in the range of 500 gms/mole to 3000 gms/mole;
   a difunctional aromatic chain extender, and
   1,5 naphthalene diisocyanate; and
   a plurality of fibers dispersed within said thermoplastic polyurethane elastomer, said fibers being present in the range of about 1% to no more than 10% by weight of said elastomeric seal composition, said fibers including a combination of glass fibers and ceramic fibers; and having an elongation in the range of 500% to 853%.

18. The elastomeric seal composition, as set forth in claim 17, wherein a seal made from said seal composition has a specific gravity of 1.22 an ultimate tensile strength in the range of 5621 psi to 8549 psi, and a Shore D hardness in the range of about 45 to about 55.

19. The elastomeric seal composition, as set forth in claim 17, wherein the % wear loss of a flat circular disc made from said seal composition after being contacted with a stationary wear plate having a surface roughness of about 1.15 microns and rotated against said wear plate for a period of about 1000 minutes at a speed of about 200 rpm, a load of about 200 psi, and at a pressure-velocity gradient of about 24000 psi-fpm, is no greater than 3% of its original thickness.

20. A process for forming a thermoplastic polyurethane elastomeric seal material, comprising the steps of:

heating a saturated hydroxyl terminated polyester diol formed by polymerizing 1,4 butanediol with adipic acid, wherein said polyester diol has a number average molecular weight in the range of 500 gms/mole to 3000 gms/mole, to a preselected temperature in the range of about 65° C. to about 75° C.;

heating hydroquinone bis 2-hydroxyethyl ether to a preselected temperature in the range of about 100° C. to about 110° C.;

mixing a predetermined amount of said polyester diol with a predetermined amount of hydroquinone bis 2-hydroxyethyl ether defining a first resultant mixture wherein said polyester diol and said hydroquinone bis 2-hydroxyethyl ether are present in a molar ratio in the range of from about 40:60 to about 60:40 to define a first polyester diol and chain extender mixture;

heating said first resultant mixture to a preselected temperature in the range of about 100° C. to about 110° C.;

mixing a plurality of fibers with the said first resultant mixture and defining a second resultant mixture, said fibers being present in the range of about 1% to no more than 10% by weight of said second resultant mixture;

heating said second resultant mixture to a preselected temperature in the range of about 130° C. to about 140° C.;

heating 1,5 naphthalene diisocyanate to a preselected temperature in the range of about 130° C. to about 135° C.;

reacting a predetermined amount of 1,5 naphthalene diisocyanate with said second resultant mixture to form a resultant compound, wherein said 1,5 naphthalene diisocyanate and said polyester diol and chain extender mixture are present in a molar ratio in the range of from about 50:50 to about 54.5:45.5;

agitating said resultant compound and heating to a preselected temperature in the range of about 135° C. to 145° C.;

curing said resultant compound at a temperature in the range of about 105° C. to about 135° C. for a period in the range of about 1 minute to about 20 minutes; and forming a resultant thermoplastic polyurethane elastomeric seal material having a elongation in the range of 500% to 853%.

\* \* \* \* \*

UNITED STATES PATENT AND TRADEMARK OFFICE
CERTIFICATE OF CORRECTION

PATENT NO. : 5,599,874
DATED : February 4, 1997
INVENTOR(S) : Stephen M. Singer et al.

It is certified that error appears in the above-indentified patent and that said Letters Patent is hereby corrected as shown below:

In claim 18, line 9, after "range of" delete the number "5621" and insert --5612--.

Signed and Sealed this

First Day of July, 1997

Attest:

Attesting Officer

BRUCE LEHMAN

Commissioner of Patents and Trademarks